FREE PATH FINDING DEVICE IN A SWITCHING NETWORK

Filed July 11, 1966 7 Sheets-Sheet 1

INVENTORS
MICHEL BASTIAN
FRANCOIS BOHY

BY Carl C. Hancock
ATTORNEY

FREE PATH FINDING DEVICE IN A SWITCHING NETWORK

Filed July 11, 1966 7 Sheets-Sheet 2

| I J K L | No | i j k l | a b c i | A B C I | RESULTS OF THE COMPARISONS |
|---|---|---|---|---|---|
| 1 1 1 2 | 1 | | 0 0 0 0 | 0 0 0 1 | |
| | 2 | 1 1 0 2 | 0 0 0 1 | 0 0 0 1 | IJ = ij AB≐ab |
| | 3 | 0 2 1 1 | 0 0 1 0 | 0 1 0 1 | I ≠ i |
| | 4 | | 0 0 1 1 | 0 1 0 1 | |
| | 5 | 0 0 1 0 | 0 0 2 0 | 0 1 0 1 | I ≠ i |
| | 6 | | 0 0 2 1 | 0 1 0 1 | |
| | 7 | | 0 1 0 0 | 0 1 0 1 | |
| | 8 | 1 1 1 0 | 0 1 0 1 | 0 1 0 1 | IJK = ijk A = a |
| | 9 | 0 0 2 1 | 0 1 1 0 | 1 0 0 1 | I ≠ i |
| | 10 | 1 2 1 2 | 0 1 1 1 | 1 0 0 1 | I = i ABC≠abc |
| | 11 | 0 2 0 0 | 0 1 2 0 | 1 0 0 1 | I ≠ i |
| $d^{\ell}$ | 12 | 1 0 2 0 | 0 1 2 1 | 1 0 0 1 | I = i ABC≠abc |
| | 13 | | 1 0 0 0 | 1 0 0 1 | |
| | 14 | 1 2 1 1 | 1 0 0 1 | 1 0 0 1 | I = i ABC=abc |
| | 15 | | 1 0 1 0 | 1 0 1 1 | |
| | 16 | | 1 0 1 1 | 1 0 1 1 | |
| | 17 | 0 1 1 2 | 1 0 2 0 | 1 0 1 1 | I ≠ i |
| | 18 | 1 1 0 0 | 1 0 2 1 | 1 0 1 1 | IJ = ij AB=ab |
| | 19 | 0 0 0 2 | 1 1 0 0 | 1 1 0 1 | I ≠ i |
| | 20 | | 1 1 0 1 | 1 1 0 1 | |
| | 21 | 0 2 0 2 | 1 1 1 0 | 1 1 0 1 | I ≠ i |
| | 22 | | 1 1 1 1 | 1 1 0 1 | |
| | 23 | | 1 1 2 0 | 1 1 0 1 | |
| 1 1 1 2 | 24 | 1 0 1 1 | 1 1 2 1 | 1 1 0 1 | I = i ABC≠abc |

| I J K L | Nº | i j k l | a b c i | A B C I | RESULTS OF THE COMPARISONS |
|---|---|---|---|---|---|
| 1 1 1 2 | 1 | | 0 0 0 0 | 0 0 0 1 | |
| d° | 7 | | 0 1 0 0 | 0 1 0 1 | |
| | 8 | | 0 1 0 1 | 0 1 0 1 | |
| | 9 | 0 0 2 1 | 0 1 1 0 | 0 1 0 1 | I ≠ i |
| | 10 | 1 2 1 2 | 0 1 1 1 | 0 1 0 1 | I = i  A B C ≠ abc |
| | 11 | 0 2 0 0 | 0 1 2 0 | 0 1 0 1 | I ≠ i |
| | 12 | 1 0 2 0 | 0 1 2 1 | 0 1 0 1 | I = i  A B C ≠ abc |
| 1 1 1 2 | 13 | | 1 0 0 0 | 0 1 0 1 | a > A. End of search |

FIG. 11

| I J K L | Nº | i j k l | a b c i | A B C I | RESULTS OF THE COMPARISONS |
|---|---|---|---|---|---|
| 1 1 1 2 | 1 | | 0 0 0 0 | 0 0 0 1 | |
| d° | 17 | 0 1 1 2 | 1 0 2 0 | 1 0 1 1 | I ≠ i |
| | 18 | 1 1 0 0 | 1 0 2 1 | 1 0 1 1 | I J = i j  A B = ab |
| | 19 | 0 0 0 2 | 1 1 0 0 | 1 1 0 1 | I ≠ i |
| | 20 | 1 1 1 1 | 1 1 0 1 | 1 1 0 1 | I J K = i j k  A = a |
| 1 1 1 2 | | | | | Final End of search |

FIG. 12

United States Patent Office 3,511,937
Patented May 12, 1970

3,511,937

FREE PATH FINDING DEVICE IN A SWITCHING NETWORK

Michel Bastian, St. Jeannet, Alpes-Maritimes, and François Bohy, Vence, Alpes-Maritimes, France, assignors to International Business Machines Corporation, Armonk, N.Y., a corporation of New York Filed July 11, 1966, Ser. No. 564,121
Claims priority, application France, Aug. 30, 1965, 7,647
Int. Cl. H04q 3/54
U.S. Cl. 179—18 21 Claims

ABSTRACT OF THE DISCLOSURE

A switching network which automatically finds a path from a given subscriber line to a given intermediate (median) junction. The switching junctions are divided into groups and subgroups, so that each junction can be referenced by three coordinates. In addition, each subscribed line or line between junctions is referenced by a fourth coordinate corresponding to its rank. The invention is based upon the finding that path interference laws can be defined in terms of the coordinates assigned. When a new call is detected by a sequential scanner that subscriber's address, in terms of its coordinates, is introduced into a register. The address coordinates corresponding to the medium matrix having the coordinates of lowest value is introduced into another register. Then the address coordinates corresponding to existing busy communication paths are introduced sequentially into another set of registers. For each of these communication paths logic circuits determine whether the previously defined interference laws are satisfied, and if so, another communication path is then examined. The searching is completed when a non-busy communication path is found or all communication paths are busy.

The present invention relates to a device for finding a free path for communication within a switching network of the plural matrix stage type which is currently found in telephony.

In common practice telephone switching a line taken out of a first set of lines (e.g., subscriber line) may often have to be coupled to some other line taken out of a second set (e.g., intermediate junction lines), lines from the latter set being far less numerous. Such coupling is generally obtained via a switch and conductor network whose basic elements are switching matrices.

A switching matrix is a plurality of switches disposed at the line and column intercepts of a matrix. In such matrices leads are disposed along the rows and will be termed herein "row leads." All the switches belonging to the same row have their first terminal attached to the corresponding row lead. Similarly, other leads, termed herein "column leads," are provided along the columns. All the switches belonging to the same column have their second terminal attached to the corresponding column lead. In that way in a given matrix any row lead may be connected to any column lead by the mere closure of just one switch.

Network organization is generally as follows:

A first set of matrices, which accommodates incoming subscriber lines, makes up the first switching stage. The first stage matrix column leads are coupled via "links," in accordance with an appropriate law, to the row leads of a second set of matrices making up a second switching stage, and so on, until the last stage where the column lead number of said last stage being equal to the desired intermediate junction line number. The connection law is such that a subscriber line will have access to any of the intermediate junction lines through action of both switches and coupling leads.

Obviously, stage number, matrix number per stage, network configuration and connection law will be relative to subscriber number and junction line number as well as to expected traffic conditions. The research work that has been carried out on optimal dimensions to be given to those parameters is fairly well known in the field. It is possible to design a system with a given number of both subscriber lines and intermediate junction lines such that the network will keep blocking probability quite low and still limit the switches to a reasonable number.

In such networks an attempt to connect a subscriber to some intermediate junction connection will have to be made before putting said subscriber into connection with some other subscriber who in turn will be connectetd to the same intermediate junction. This communication path calls for closure of a number of switches (one per switching stage) establishing a communication path composed of a number of "links" (the lines between switches). For any further connection attempt between two other subscribers a new path will have to be found with no parts (switches or links) common with established communication paths.

Heretofore, such inquiry called for a reiterated scanning of the state of those links either by testing them directly in the network itself, or by testing an "image network" duplicating at all times all of the network element states. The method used was generally involved, often lengthy, and the circuits and devices used therewith were quite complicated, bringing about in some cases disturbances into the voice circuit.

Accordingly, one of the objects of the invention is to provide for a scheme and device for finding a free path for communication within a switching network between a given incoming line and an arbitrary output line, said scheme and device leading to reliable and inexpensive implementations.

Another object of the invention is to simplify current procedures for finding free paths for communications and thereby hardware therefor.

Still another object of the invention is to cut down on the time necessary for finding a free path.

Another object yet of the invention is to avoid testing for a free path on network links themselves.

A further object of the invention is to cut down on the amount of information to be stored in an "image" network and to make such information more readily readable.

Another object of the invention is to avoid those circuits in prior art systems which kept already busy switches from being marked (i.e., avoid inhibiting circuits).

Another object of the invention is to have the controls decentralized in order to establish paths within large scale networks in a manner independent from the main control unit.

Another object of the invention is to provide for a coordinate system identifying the network's various elements which the system allows to readily and rationally define the various paths between said network inputs and outputs.

Another object of the invention is to take advantage of network structure to set up some simple "interference laws" between the various paths which would determine whether or not a given path has any common parts with any other given path.

These and other objects become more apparent from the following description of a preferred embodiment. The invention utilizes a multi-coordinate address system for identifying the network's various elements. The address system defines a connection scheme utilized for coupling the various matrices such that paths between input and output lines are completely defined by the mere knowledge of said input and output line addresses. (Input lines refer to the input subscriber lines and output lines refer to the *input* intermediate-middle-junction lines.)

Relations are found which, when satisfied, define two "non-interfering paths." Since a set of input and output addresses specify a path, when the relations are satisfied by two sets of input and output addresses, two "non-interfering" communication paths have been defined.

The preferred embodiment of the invention is implemented by storage means which store an address pair should a path be established between an output and input line. These address pairs are arranged in the storage means in order of their output lead addresses. They are additionally means identifying a given input line "asking" for path allocation and associating the input line address with the first output line (in order of increasing output address). Further, logic means compare the coordinates and the storage means corresponding to an existing communication path to determine if the existing path and the path determined by the asking subscriber and the proposed output line have any parts in common.

If interference should be sensed, then the logic means look for the smallest output line address to be associated to the given "asking" subscriber line address for avoiding interference. The newly formed address pair will be compared to the following address pair of existing communication paths taken from the storage means.

If there is no interference, then the logic means will compare the initially formed address pair with the second address pair of existing communication paths in the storage means.

The two comparisons go on as illustrated above until all address pairs taken from the storage means have been examined. After all the address pairs in the storage means have been examined, the logic means assign the input lines to the last output line associated with that input line.

The foregoing and other objects, features and advantages of the invention will be apparent from the following more particular description of a preferred embodiment of the invention, as illustrated in the accompanying drawings.

In the drawings:

FIG. 1 discloses a schematic view of a switching network including from subscriber lines to the intermediate junction in accordance with the present invention.

FIG. 1' discloses a connection scheme between various stages of the network disclosed in FIG. 1.

FIG. 2 discloses schematically a switching matrix configuration.

FIG. 3 shows the connection scheme between the various stages of the network disclosed in FIG. 1.

FIG. 4 discloses schematically two distinct paths allowing to connect two distinct subscribers.

FIG. 5 discloses the general organization of a device embodying the instant invention.

Figure 6:
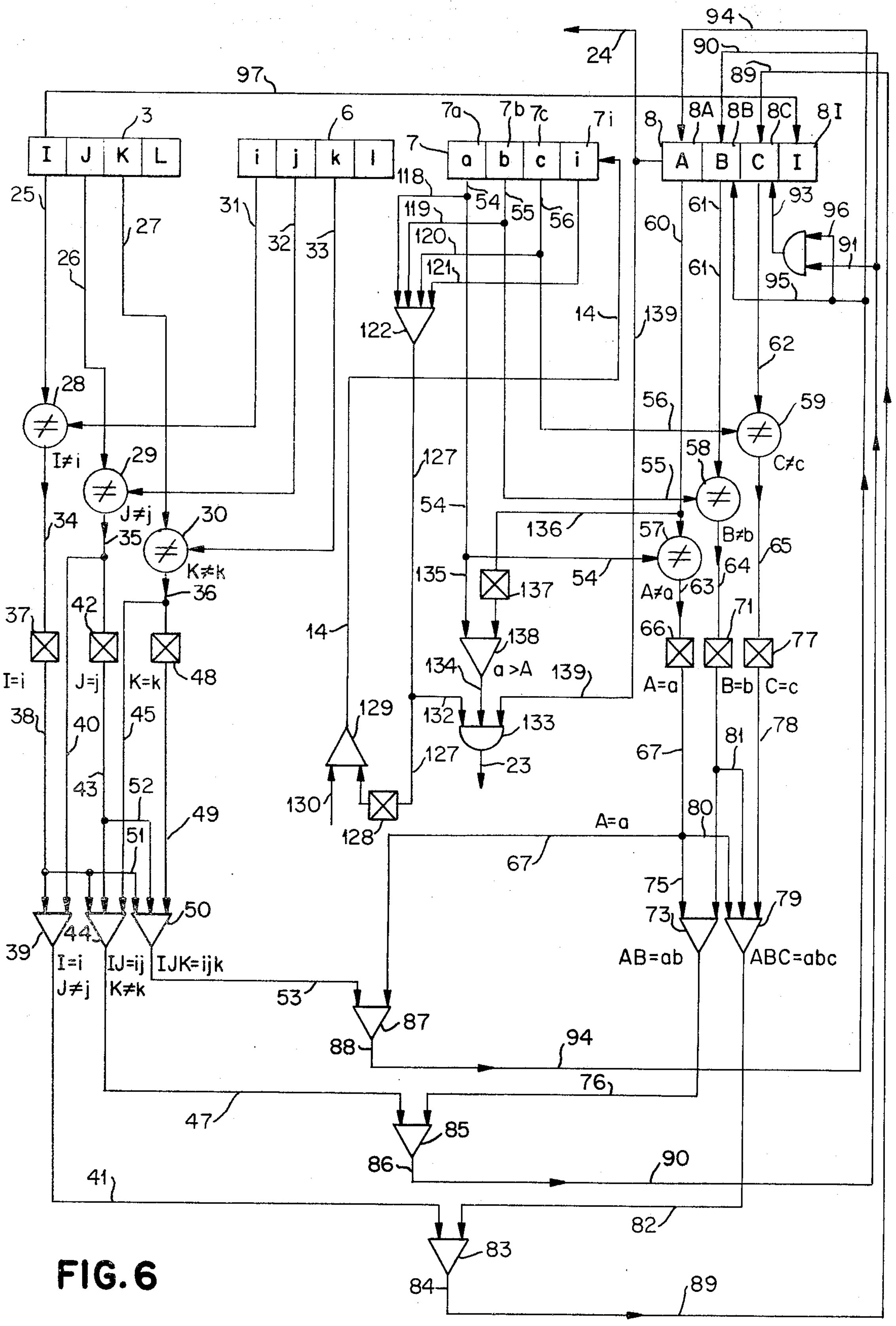
FIG. 6 shows the logic circuitry of a device embodying the invention.
Figure 7:
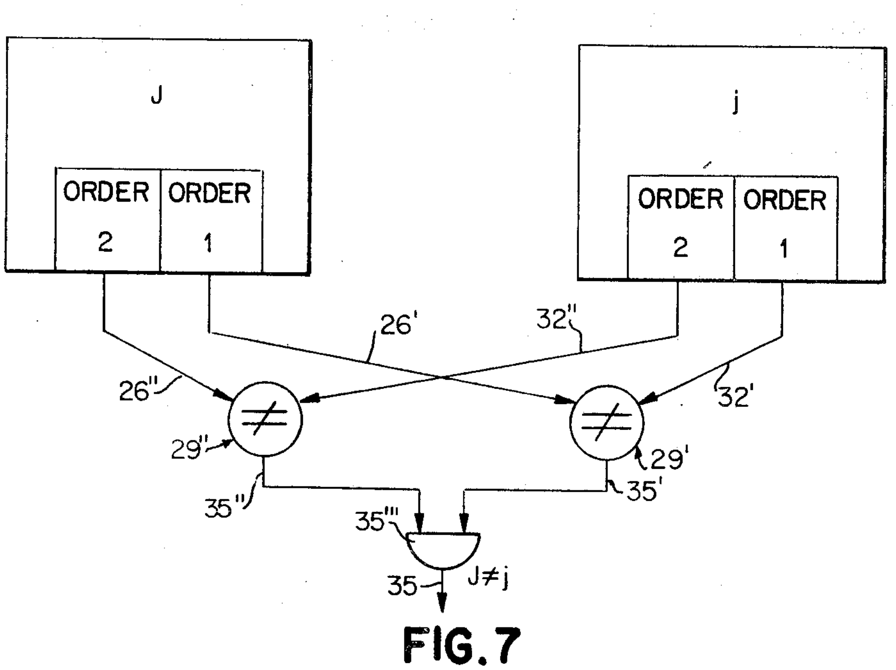
FIG. 7 shows how comparison may be performed between J and *j* coordinates held in registers 3 and 6, disclosed in FIG. 6.
Figures 9, 10:
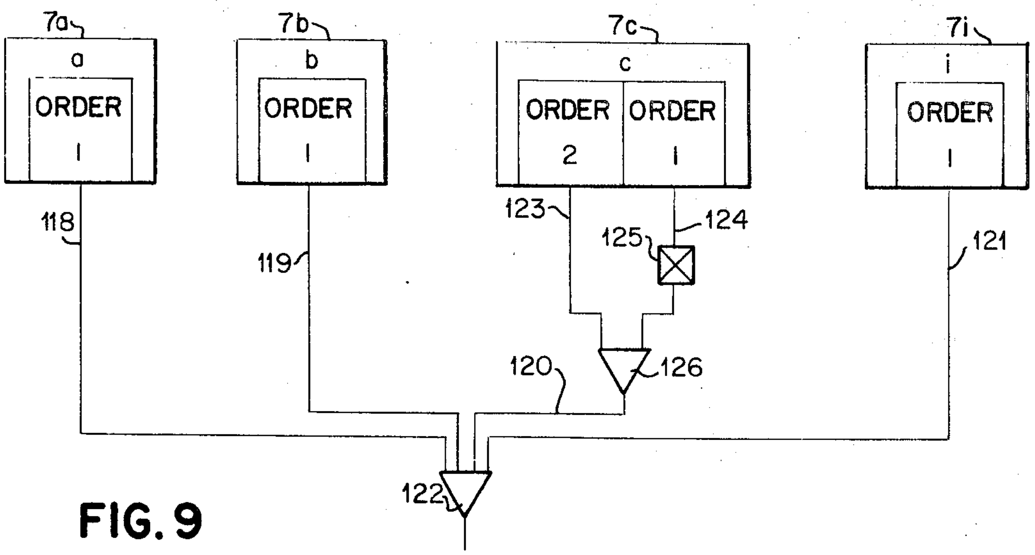

FIG. 9 discloses operation of register 7 illustrated in FIG. 6.

FIG. 10 is a chart showing schematically a complete free path finding process. This is the most general case.

FIG. 11 is a chart showing a complete free path finding process. This is a particular case.

FIG. 12 discloses a free path finding process in the case when no free path can be found.

SWITCHING NETWORK DESCRIPTION

Figure 1:
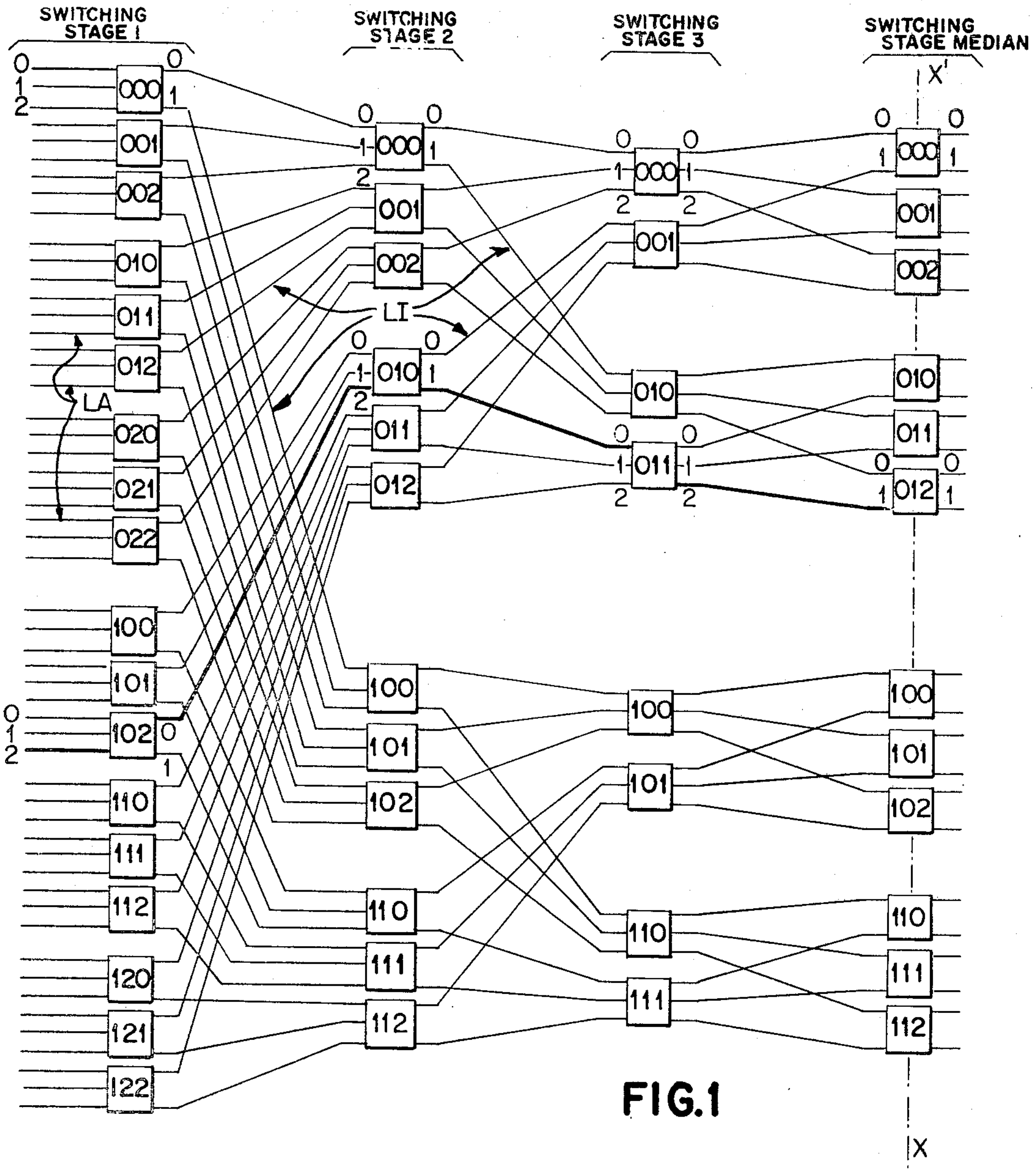
Figure 1:
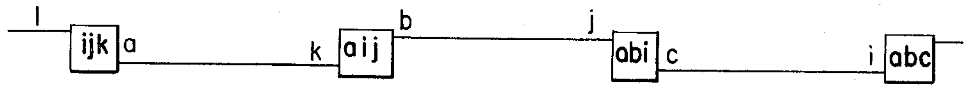

Referring to FIG. 1 there is shown a portion of a switching network supposedly part of a Private Branch Exchange. This example has been chosen simply for the purpose of specification and drawing clarity, but said Exchange may comprise a greater number of subscribers (e.g., telephone extensions) together with an appreciably increased number of both matrices (referred to above as junctions) and the links.

From FIG. 1, may be seen: 54 input leads such as those marked "LA" referring to the subscriber lines (referred to hereinafter as "subscriber"), three switching matrix stages referenced as $ST_1$, $ST_2$ and $ST_3$, a half-way stage referenced as $ST_M$, and coupling leads termed "links" such as "LI" coupling the various stage matrices. The $ST_M$ stage hase been termed halfway stage (referred to above as intermediate junction) owing to the entire network being symmetrical about that stage (X'X axis of symmetry); the omitted stages are then respectively identical to $ST_3$, $ST_2$, $ST_1$ and the 54 output lines from the last stage are respectively connected to the above mentioned 54 LA lines. The entire network comprises seven switching stages, and each subscriber accesses the network through two points symmetrical about the median stage.

Figure 2:
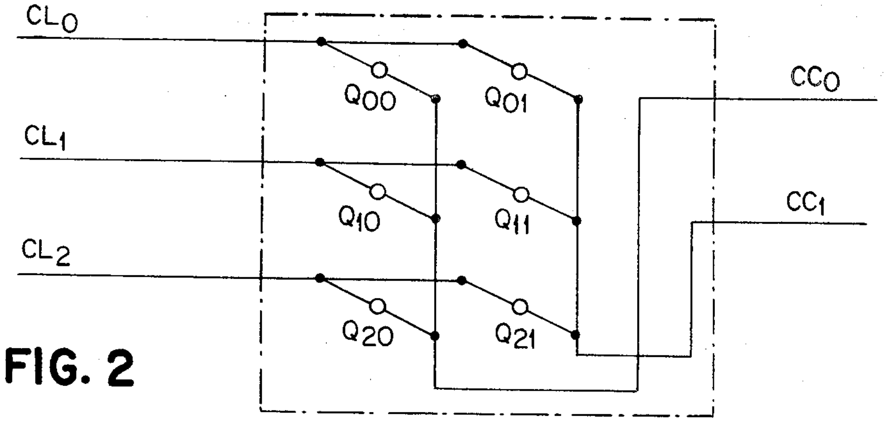

The various matrices have been shown as blocks on the figures but their internal configuration is conventional as may be seen from FIG. 2 wherein a three row lead ($CL_0$, $CL_1$, $CL_2$ and two column lead ($CC_0$, $CC_1$) matrix has been illustrated. Said matrix switches $Q_{00}$, $Q_{01}$, $Q_{10}$, $Q_{11}$, $Q_{21}$ allow the connection of an arbitrary row lead to any of the column leads. For example, closing $Q_{10}$ will establish electrical connection between row lead $CL_1$ and column lead $CC_0$.

As will be seen subsequently, it is obvious that the row and column lead number varies depending on which stage said matrix is found to be.

Still referring to FIG. 1, it may be seen that the first stage $ST_1$ or "input stage" comprises eighteen matrices divided into two groups of nine matrices, each group being itself subdivided into three subgroups of three matrices, and each matrix comprising three row leads (in this instant, three subscriber lines) and two column leads.

Said first stage matrices are identified by means of three coordinates:

from left to right, the first coordinate "*i*" stands for said above mentioned group number; that is, 0 or 1.

the second coordinate "*j*" stands for the above mentioned subgroup number; that is, 0, 1 or 2.

the third coordinate; that is, "*k*," stands for the matrix rank into said subgroup, e.g., 0, 1 or 2.

Illustratively, that matrix whose coordinates are 102 is the third matrix of the first subgroup of the second group.

A row lead will be assigned a coordinate, that is, "*l*" which may values 0, 1 or 2; similarly, a column lead is assigned a coordinate, that is "*a*," which may take the values 0, or 1. With such addressing scheme it may be readily seen that an arbitrary link will be completely defined by a four coordinate address "*ijkl*."

The second stage $ST_2$ comprises a set of twelve matrices, divided into two groups of six, each group being itself subdivided into two subgroups of three matrices each, and each matrix comprising three row leads and two column leads. Said matrices are assigned coordinates according to the same above mentioned addressing principle. Said coordinate may thereby take the following values:

0 or 1 for the group (two groups)
0 or 1 for the subgroup (two subgroups per group)
0, 1 or 2 for the matrix (three matrices per subgroup)
0, 1 or 2 for the row lead (three per matrix)
0 or 1 for the column lead (two per matrix), let "*b*" be this coordinate.

The connection scheme between matrices of the first and second stage is as follows: a first stage column lead of complete address *"ijka,"* (*"ijk"* representing the matrix coordinate and *"a"* representing the column address) is coupled to the second stage row lead of complete address, *"aijk"* (*"aij"* being the matrix coordinate and *"k"* the conductor coordinate) via the *"a"* link; this scheme is illustrated on FIG. 3. For specification clarity, each row or column lead will be identified by its four coordinates, said lead coordinate being separated from matrix coordinate by a dash. Said lead coordinate is the left most or right most coordinate according to whether it stands for a row lead or column lead respectively. Therefore, in accordance with said law and the above example, column lead *"ijk–a"* is coupled to row lead *"k–aij."*

Application of said law is very simple: suppose for example, that the first stage lead 102–0 is to be connected. Here $i=1$, $j=0$, $k=2$ and $a=0$. Said lead has to be coupled to the second stage lead *k–aij* that is to lead 2–010 (heavy line connection of FIG. 1).

The third stage $ST_3$ comprises eight matrices divided into two groups of four, each group being itself divided into two subgroups of two matrices each, and each matrix comprising three row leads and two column leads.

According to the same addressing system as below, the various coordinates may take the following values:

0 or 1 for the group
0 or 1 for the subgroup
0 or 1 for the matrix
0, 1 or 2 for the row lead
0, 1 or 2 for the column lead (let *"c"* be this coordinate).

The connection scheme between matrices from the second and third stage is as follows: a second stage column lead *"aij–b"* is coupled to the third stage row lead *"j–abi,"* through a link (see FIG. 3). Illustratively, the second stage lead 010–1 is coupled to the third stage lead 0–011 (heavy line on FIG. 1).

The fourth stage or median stage $ST_M$ comprises twelve matrices divided into two groups of six, each group being itself subdivided into two subgroups of three, and each matrix comprising two row leads and two column leads (since this stage makes up this network symmetry axis).

In this stage the various element coordinates take the following values:

0 or 1 for the group
0 or 1 for the subgroup
0, 1 or 2 for the matrix
0 or 1 for the row lead
0 or 1 for the column lead.

(The column leads actually belong to the second half of the network which has been omitted from FIG. 1 and is not described further in the specification since the two halves operate identically.)

The connection scheme between third and fourth stage is as follows: a third stage column lead *"abi–c"* is coupled to the fourth stage row lead *"a–abc"* (see FIG. 3). Illustratively, the third stage lead 011–2 is coupled to the fourth stage lead 1–012 (heavy line portion of FIG. 1).

Figure 3:
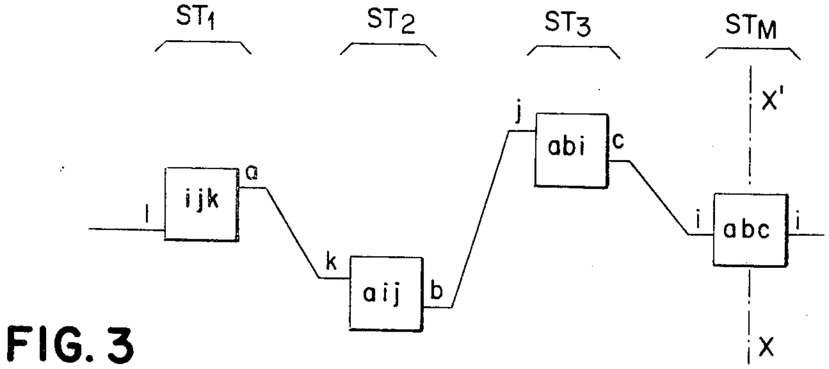

It follows from the above description and FIG. 3, that a pair of addresses *"ijkl"* and *"abc"* always defines one and only one path between the subscriber and the corresponding half-way matrix.

Knowledge of said two addresses defines all network elements (matrices, switches and links) found in the communication path between said two addresses. As an illustration the communication path having the subscriber with the address *ijkl*=1022 (i.e., lead *l–ijk*=2–102—all subscriber addresses will be shown without the hyphen) and the half way matrix of address *abc*=012 defines the heavy line path in FIG. 1. In the various matrices to be found throughout this path, switches to be closed are defined by the respective coordinates of column and row leads utilized in the considered matrix; in this instant example, said switches are (using the same reference system as in FIG. 2):

$Q_{20}$ for matrix 102 of first stage $ST_1$
$Q_{21}$ for matrix 010 of second stage $ST_2$
$Q_{02}$ for matrix 011 of third stage $ST_3$.

Figure 4:
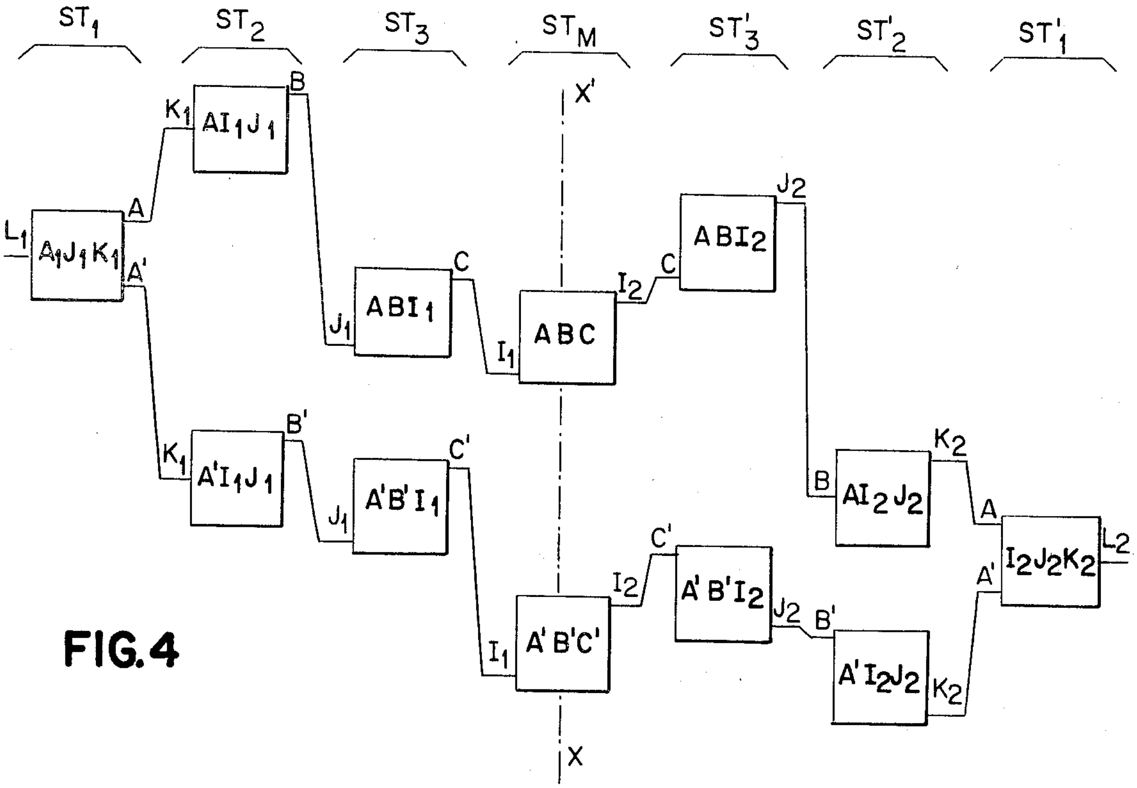

An identical result as that illustrated in FIG. 3 applies for connections within the network's second half. In order to better illustrate this, FIG. 4 shows two distinct paths connecting two subscribers of respective addresses: "$I_1J_1K_1L_1$" and "$I_2J_2K_2L_2$" via the following seven stages, $ST_1$, $ST_2$, $ST_3$, $ST_M$, $ST'_3$, $ST'_2$, $ST'_1$.

The first path passes through half way matrix of address "ABC" and the second path goes through half way matrix of address "A'B'C'". It may be readily seen, referring to said FIG. 4 that knowledge of two subscriber addresses together with a half way matrix uniquely defines a path between said two subscribers. It should also be observed that a free path between two subscribers may be found in two steps: (1) finding out a half way matrix defining a free path between said matrix and the first subscriber; (2) finding out whether the unique path defined by said matrix and second subscriber is free or not. Said two steps are actually of the same nature and may be carried out in the same time by means of identical processes and devices. Therefore, the following description refers to the network's first half as shown in FIG. 1, the description applying as well to the network's second half. For this reason the term half way matrix and output matrix can and will be used interchangeably.

LOGIC CONSIDERATIONS DERIVED FROM NETWORK CONFIGURATION

In accordance with the instant invention, it is possible to derive a number of relations which, when satisfied, will insure that two paths (defined by the addresses of two distinct subscriber-half way matrix pairs) do not have any parts in common. Moreover, said relations need only deal with the network's input matrix and half-way matrix address, since said addresses are sufficient to define path portions wherein overlapping (two paths sharing a common part) may occur.

These said relations are tabulated below (coordinates indicated by dots represent those coordinates whose values are indifferent):

| | Input matrix | | Half-way matrix (output matrix) |
|---|---|---|---|
| Case 1 | ijk | | abc |
| | i'. . | | . . . |
| | ijk | | abc |
| Case 2 | ij'. | | a'. . |
| | | or | .b'. |
| | | or | . .c' |
| | ijk | | abc |
| Case 3 | ijk' | | a'. . |
| | | or | .b'. |
| Case 4 | ijk | | abc |
| | ijk | | a'. . |

Equalities as $ABC=abc$ indicate that all corresponding coordinates are alike; that is, in this instant, $A=a$, $B=b$ and $C=c$. If any of the corresponding coordinates do not match, then one gets inequalities such as $ABC \neq abc$.

In Case 1, each subscriber belongs to one distinct group (i.e., the "*i*" coordinate differs). Said subscriber may be coupled to any two half way matrices and even to the same matrix. Indeed, a matrix having at least two rows and two columns may always define two distinct paths.

In Case 2, both subscribers belong to the same group (the "*i*" coordinate being the same), but each one belongs to one distinct subgroup (the "*j*" coordinate differing); they necessarily have to be coupled to two different half way matrices.

In Case 3, both subscribers belong to the same group (same "*i*"), the same subgroup (same "*j*"), but they each belong to one distinct matrix; they must then be coupled to two half way matrices which belong to two different groups, or to the same group but to two different subgroups.

In Case 4, both subscribers belong to the same input matrix (same "*ijk*"); they must be coupled to two half way matrices belonging to two different groups.

In accordance with the invention, should there exist a free path between a subscriber of address "IJKL" and the network half way stage, a half way matrix of address "ABC" can be found such that the address pair "IJKL–ABC" and each one of those address pairs defining already existing communication paths will satisfy all of the above four relations.

Finding such a matrix is carried out readily and rationally by means of the following devices which will be described with reference to FIGS. 5 to 10.

FREE PATH FINDING DEVICE DESCRIPTION

Figure 5:
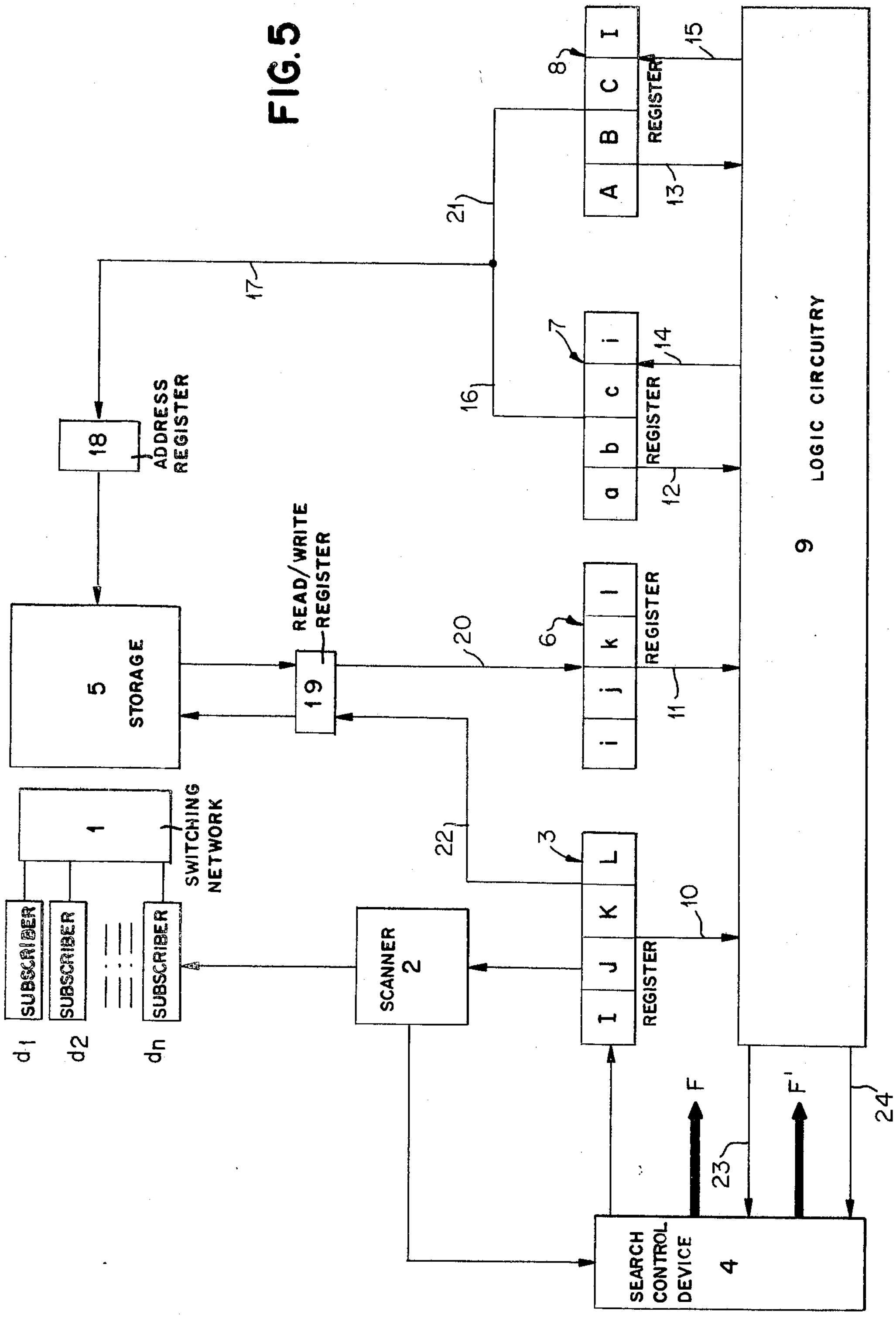

Referring to FIG. 5 there is shown a block diagram of the general organization of a free path finding device of the preferred embodiment of the invention for the switching network shown in FIG. 1 $d_1d_2 \ldots d_4$ represent the subscriber circuits.

A scanner 2 continuously tests said subscriber circuits to detect all calls. Said scanner is controlled by a register 3 wherein all subscriber circuit addresses circulate at some regular pace. Should a call be sensed, scanner 2 will send a signal across a search control device 4 which will immediately cause register 3 to lock, the latter register then holding the address "IJKL" of that particular calling subscriber. Simultaneously, device 4 causes search operations to be initiated and sequentially causes a number of devices involved in these operations to start operating. (The above two initiation controls are represented by arrows F and F′.)

The path finding device itself comprises a storage 5, three registers 6, 7 and 8 and logic circuitry generally shown under 9 in FIG. 5.

Storage 5, which may be for example of the magnetic core type, is subdivided into 24 addressable blocks. The address of each one of said blocks refers to the half way matrix input lead address "abci", hereinafter termed half way lead. Whenever a connection between a subscriber "IJKL" and a half way matrix "ABC" is established, e.g., between leads "L–IJK" and lead "I–ABC", that address "IJKL" is written into the storage block whose address corresponds to "ABCI." Therefore, each storage block corresponding to a busy half way lead holds at any instant the address of that subscriber connected with said lead. The remaining storage blocks hold a mask code.

The information held in that memory thus constitutes a busy path permanent table, i.e., a record of the busy communication paths. It should be noted that apart from the major role conferred to it, i.e., identifying the path allotted a subscriber that just hooked up, said storage indicates which switches need resetting after a subscriber has finished talking.

Registers 6 and 7 are provided for receiving in succession during free path search operation, all address pairs "*ijkl–abci*" corresponding to already existing paths. Register 8 is provided for receiving half way lead addresses "ABCI" associated in succession to subscriber "IJKL" during said search operation. Each of said registers 3, 6, 7 and 8 are coupled to logic circuitry 9 so as to enable register content scanning or readout. These couplings are referenced as 10, 11, 12 and 13 respectively on FIG. 5. Registers 7 and 8 operate as counters, and, as will subsequently be seen, receive through coupling 14 and 15, respectively, a stepping input from logic circuitry 9.

The four registers are also connected to storage 5 in a manner which follows:

Storage 5 may be addressed from register 7 via couplings 16 and 17 and address register 18; the read/write register 19 and coupling 20 permit the reading out of storage 5 and writing into register 6 the subscriber address "*ijkl*" connected to that half way lead whose address "*abci*" is held in register 7. Should there be no subscriber connected to said half way lead, then register 6 will receive a mask word.

Memory 5 may similarly be addressed from register 8 through couplings 21 and 17, and address register 18; coupling 22 and Read/Write register 19 allows address "IJKL" in register 3 to be read into that storage block whose address corresponds to "ABCI." Such an operation is carried out at the end of a path search whenever a half way lead "ABCI" has been definitely assigned to subscriber "IJKL" thereby allowing the newly established connection to be read into storage 5.

Logic circuitry 9 is connected to control device 4 via couplings 23 and 24. The former coupling indicates to said device 4 a successful search end, and coupling 24 indicates overflow whenever the requested communication connection cannot be established. In the first case, device 4 specifies to read into storage the newly obtained path (refer to previous paragraph) and initiates both masking and actual establishment of said path in the network. In both cases it specifies search halt as well as initiation of register 3 and, thereby, scanner 2.

Turning to FIG. 6, there is shown the preferred embodiment of the main devices and logic circuits of reference 9 in FIG. 5. Reference 9 logic allows information held in registers 3, 6, 7 and 8 to be processed. For said figures, the following symbols are being used:

The compare circuits or comparators are identified by circles; circles enclosing a "=" sign are indicative of those circuits delivering an output signal whenever the inputs to said circuits compare, and circles enclosing a "≠" sign are indicative of circuits indicating an output for non-comparing inputs. Inputs to said circuits may be distinguished over output therefrom via the arrows carried by said circuits.

Logic inverters are shown as squares together with diagonals in heavy line.

Logic gates acting as AND circuits are shown as isosceles triangles.

Logic gates having an OR function are represented by arcs bounded by their subtense.

Comparison of information held in registers 3 and 6 respectively is performed by means of the circuits to follow.

The "IJK" coordinates held in register 3 are read out via three lines 26, 26 and 27 (said circuits were grouped under coupling 10 on FIG. 5) feeding respectively three comparators 28, 29 and 30. Similarly, the "*ijk*" coordinates held in register 6 are read out via three circuits 31, 32 and 33 (generally shown under coupling 11 of FIG. 5) making up a second input to the previous three comparators 28, 29 and 30, respectively. The outputs from said comparators 34, 35 and 36, respectively, will be excited whenever the contents from registers 3 and 6 do not compare.

In the instant example, comparison between coordinate "I" and "*i*" may be effected in a single comparator since each of said coordinates may be coded using a first order bit ("I" and "*i*" may only take two distinct values). This cannot be done with the comparison of "J" and "*j*" or "K" and "*k*." Indeed, these coordinates may each take on the distinct values requiring two binary bits. In order to compare "J" and "*j*" for example, information of order one should be compared with each other, and then similarly compared, information of order two. "J" and "*j*" will be different if either the information of order one or order two do not compare. The corresponding circuits are shown on FIG. 7:

Circuits 26′ and 32′ together with comparator 29′ are provided for comparing information of order one, while circuits 26'' and 32'' together with comparator 29'' are provided for comparing information of order two. The outputs from said comparators 29' or 29'' are excited if their respective inputs do not compare. Thus, OR circuit 35''' whose output 35 (corresponding to circuit 35 of FIG. 6) is excited if "J" and "*j*" do not compare ("J"≠"*j*"). "K" and "*k*" may obviously be compared in a similar circuit.

Returning to FIG. 6, the output circuit from comparator 28 feeds via inverter 37 and circuit 38 into AND gate 39, said circuit 38 making up a first input to said AND gate 39. The second input 40 to said gate 39 is taken from output 35 of comparator 29. The output circuit 41 from gate 39 will thereby be excited should the following conditions be satisfied: $I=i$ and $J\neq j$.

Output 35 from comparator 29 excites via inverter 42 and circuit 43, AND gate 44, said circuit 43 making up a first input to said gate 44. The second input 45 to gate 44 is taken from output 36 of comparator 30, and the third input 46 to said AND gate is taken from output 38 of inverter 37. The output circuit 47 from said AND gate 44 is excited should the following conditions be satisfied: $I=i$; $J=j$; $K\neq k$.

Output 36 from comparator 30 feeds via inverter 48 and circuits 49 into AND gate 50, said circuit 49 making up a first input to said AND gate 50. The second input 51 to said gate is taken from output 38 of inverter 37, and the third input 52 is taken from output 43 of inverter 42.

The output 53 from AND gate 50 is excited if "*I*"="*i*"; "*J*"="*j*" and "*K*"="*k*."

Still referring to FIG. 6, comparison of information held in registers 7 and 8, at any given instant, will now be described.

The "*abc*" coordinates held in register 7 are read out via three circuits 54, 55 and 56 (circuits grouped under coupling 12 on FIG. 5) feeding respectively comparators 57, 58 and 59, said circuits making up a first input to said comparators. Similarly, the "ABC" coordinates held in register 8 are read out by three circuits 60, 61 and 62 (circuits grouped under coupling 13 of FIG. 5) making up a second input to said comparators 57, 58 and 59, respectively. Respective outputs 63, 64 and 65 from said comparators are excited if the comparators inputs do not compare. Comparison between coordinates "C" and "*c*" may be performed by an arrangement similar to the one described with reference to FIG. 7.

The output circuit 63 from comparator 57 comprises an inverter 66; the output circuit 67 from said inverter is excited for "*A*"="*a*."

The output 64 from comparator 58 feeds via inverter 71 and circuit 72 into AND 73, said circuit 72 making up a first input to said gate 73. Said gate comprises a second input 75 taken from output 76 of inverter 66. The output 76 from said gate 73 is excited if "*A*"="*a*" and "*B*"="*b*."

The output 65 from comparator 59 forms via inverter 77 and circuit 78 an input into AND 79, the latter comprising a first input to AND gate 79. Said AND gate 79 comprises a second input 80 taken from circuit 67 and a third input 81 taken from output 72 of inverter 71. The output 82 from AND gate 79 is excited if "*A*"="*a*," "*B*"="*b*" and "*C*"="*c*."

The output circuits 41 and 82 are ANDed by AND circuit 85 whose output is excited should the simultaneous conditions "*I*"="*i*" and "*ABC*"="*abc*" be satisfied. Similarly, circuits 47 and 76 are ANDed by AND gate 85 whose output is excited if equations "*IJ*"="*ij*" and "*AB*"="*ab*" are simultaneously satisfied. Output 53 and 67 are ANDed by AND gate 87 whose output is excited if "*IJK*"="*ijk*" and "*A*"="*a*" simultaneously.

Output 84 from gate 83 through circuit 89 increments by one the coordinate "C" of register 8. Output 86 from gate 85 causes (1) through circuit 90 the coordinate "B" to increment by, one and (2) the reset to zero of coordinate "C" via circuit 91, AND gate 92, and circuit 93. Output 88 from AND gate 87 causes (1) through circuit 94, the coordinate "A" to increment by one, (2) the reset to zero of coordinate "B" via 95, and (3) the reset to zero of coordinate "C" via 96, AND gate 92 and circuit 93. Circuit 89, 90 and 94 were grouped under coupling 15 in FIG. 5.

Figure 8:
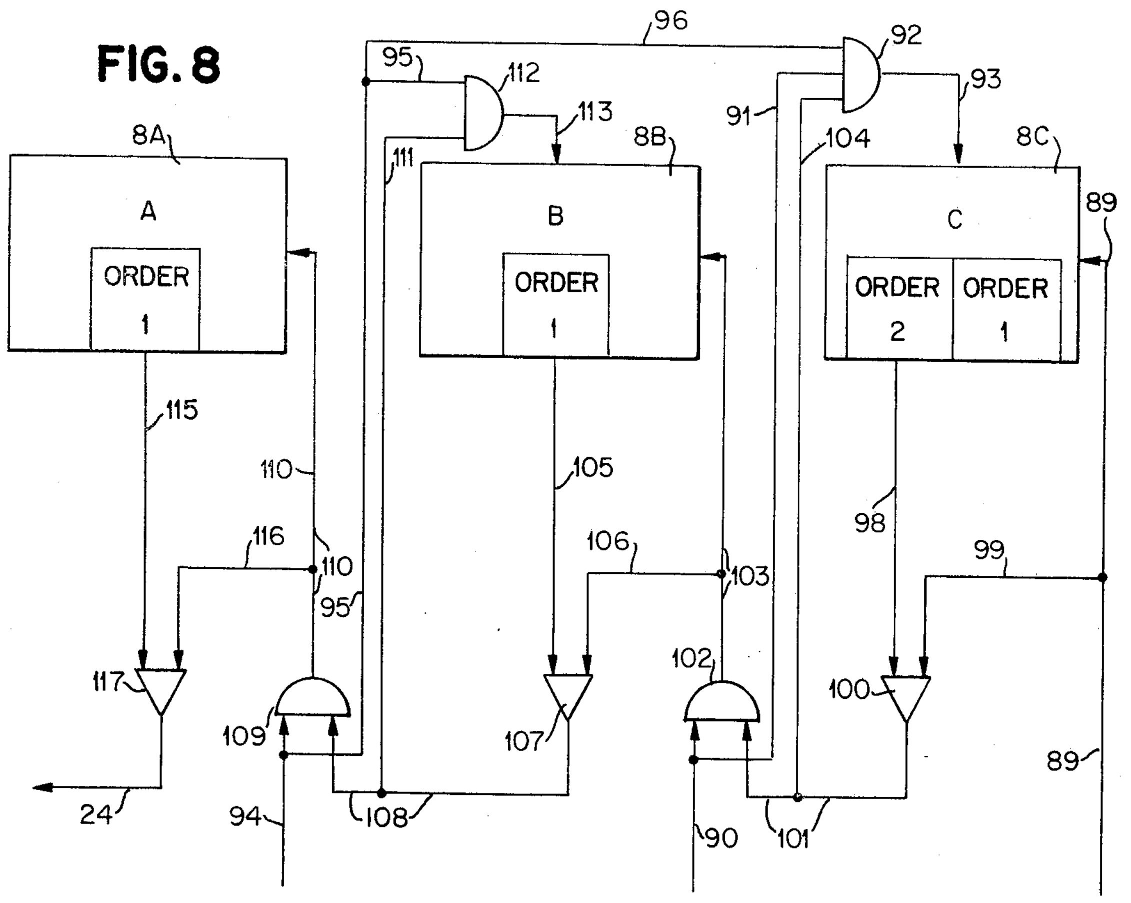
FIG. 8 is a schematic view disclosing register 8 operation, said register being shown in FIG. 6.

Turning now to FIG. 8, there is shown a more detailed logic diagram of register 8 which comprises a number of subregisters. Only subregisters 8A, 8B and 8C have been shown on the drawing; subregister 8I has been omitted since the "I" coordinate held in register 3 is merely transferred through circuit 97 into subregister 8I (FIG. 6).

Since "A" and "B" respectively, may only take two distinct values in the instant example, the corresponding subregisters each comprise one binary position. On the other hand, since the "C" coordinate may take three distinct values, subregister 8C has to comprise two binary positions. To the following three decimal digit 0, 1, 2 correspond the binary codes "00," and "10"; the code "11" (representing 3) is not used.

Whenever circuit 89 is excited (e.g., "*I*"="*i*," "*ABC*"="*abc*"), subregister 8C which actually acts as a counter will be caused to count up. Should the following information be stored therein "00" or "01" the counter will normally add up to get "01" or "10." But if the information stored therein is "10" said subregister 8C should not count up, since the decimal digit 3 ("11" binary form) does not exist, but will indicate a carry over to subregister 8B. For this, circuit 98 sensing binary digit "10" and, circuit 99, a branch of circuit 89, will be ANDed by AND gate 100 whose output 101 is applied to OR gate 102. Said gate 102 is also fed by circuit 90 (FIG. 6) and causes through circuit 103 subregister 8B to count up. Simultaneously circuit 104 from circuit 101 causes via OR gate 92 and circuit 93 subregister 8C to reset.

Whenever circuit 90 is excited, that is whenever "*IJ*"="*ij*" and "*AB*"="*ab*," subregister 8B will be caused to count up, via gate 102 and circuit 103, and subregister 8C will be set to zero via 91, gate 93 and circuit 93.

If "0" is stored into 8B, said subregister 8B will count up, but if subregister 8B is already set to the state "1," a carry over to block 8A occurs. This happens as follows: Circuit 105, which is a "one" detector, and circuit 106, a branch of circuit 103, will be combined in AND gate 107 whose output 108 conditions OR circuit 109. OR gate 109, also conditioned by circuit 94, (FIG. 6) causes subregister 8A to be incremented by one via circuit 110; simultaneously circuit 111 from circuit 108 causes via OR gate 112 and circuit 113 subregister 8B to reset.

Whenever circuit 94 is excited (that is, whenever "*IJK*"="*ijk*" and "*A*"="*a*") (1) subregister 8A is caused to count up via gate 109 and circuit 110, (2) subregister 8C is caused to reset via circuit 96, gate 92 and circuit 93, and (3) steps subregister 8B via branch 95, gate 112 and circuit 113. Subregister 8A counts up should it be storing a "0." If subregister 8B is laready set to "1" it indicates an overflow. For this, circuit 115 acting as a "1" detector and circuit 116 from circuit 110 are combined by AND circuit 117 whose output is excited (FIG. 5) in case of overflow condition.

Turning back to FIG. 6, the logic circuitry of stepping register 7 will now be described. Register 7 is actually a counter whose four binary subregisters **7*a*, 7*b*, 7*c* and 7*i*** may respectively hold as maximal values 1, 1, 2 and 1. During a free path finding, said register has to continuously count up so as to hold successively all half-way lead addresses from 0000 up to 1121. Such successive stepping is obtained by adding "1" to the address "*abci*" after each completed compare operation (comparing "IJK–ABC" to "*ijk–abc*" together with eventual stepping of register 8) until address 1121 of the last half-way lead comes up into register 7.

Actually register 7's stepping circuits are designed to detect address 1121 and issue a stepping order each time such address 1121 is not detected.

Said circuits are shown generally in FIG. 6 by three shunts 118, 119, 120 and circuit 121 making up the conditioning inputs of AND gate 122. A more detailed description of these circuits is illustrated on FIG. 9. Circuits 118, 119 and 121, whose corresponding subregisters *7a*, *7b* and *7i* are one binary position units, are directly fed into AND gate 122 as already illustrated on FIG. 6; said three circuits are excited whenever *7a*, *7b*, *7i* respectively are in the state "1." But, as subregister *7c* comprises two binary positions, the circuit grouped under 120 on FIG. 6 is excited should subregister *7c* be holding "10", i.e., the decimal digit 2 of address 1121. Sensing of said information "10" is accomplished through two branches, that is circuit 123 and circuit 124, together with inverter 125, both branches being ANDed by AND gate 126.

Output 127 from gate 122, which is excited whenever "*abci*"=1121, conditions, via inverter 128, AND gate 129; said input to gate 129 is excited whenever 1121 is not present in register 7. A second input to said gate 129 is taken from a timing circuit 130 delivering a pulse at the end of each complete compare operation. The output circuit 14 (also refer to FIG. 5) from gate 129 is therefore regularly excited as long as register 7 does hold addresses different from 1121. In accordance with the above-mentioned process circuit 14 causes register 7 to count up.

Circuit 132, a branch of output circuit 127 of gate 122, is excited when address 1121 is detected and indicates the end of the search operation. Circuit 132 is continued by circuit 23 via OR gate 133 and puts out a signal indicative of search end.

OR gate 133 is similarly conditioned by a second circuit 134 indicating the condition "*a*" greater than "A." Indeed, should said condition be satisfied at some instant, then no more interfering paths (paths with common portions) will be found since circuits 67, 76 and 82 can no longer be excited. The contents of register 8 are thus prevented from modification at times when "*a*">"*A*" by circuit 23.

In this case, an end of search signal may be issued before all existing paths are through being examined. This condition is sensed via branch 135 of circuit 54 together with branch 136 of circuit 60 via inverter 137, both branches being ANDed by AND gate 138 whose output conditions OR gate 133 through circuit 134.

OR gate 133 is also conditioned by a third circuit 139 which is just a branch from circuit 24 which is for halting the search in case of an overflow.

FREE PATH FINDING EXAMPLES

Turning now to FIGS. 5, 6, 10, 11 and 12, three complete free path finding procedure examples will be now disclosed.

(1) Successful attempt—General case

FIG. 10 discloses a chart showing the contents of all four registers during the various steps involved in a free path finding attempt, together with corresponding logic conditions. The "*abci*" and "*ijkl*" columns from this chart indicate the half-way lead address and subscriber address corresponding to already established paths. The blanks from the "*ijkl*" column indicate that the corresponding half-way lead is not connected to any subscriber.

Suppose the scanner 2 has just sensed some calling subscriber and device 4 has locked register 3. At said instant said register 3 is holding the calling subscriber address, for example 1112. Device 4 causes a search operation to be initiated in order to find out some free path between that subscriber and an arbitrary half-way matrix. All through the search operation device 4 will sequentially control, under the control of a timing circuitry, various operations to be described. For drawing clearly, said timing circuitry has been shown under arrows F and F' on FIG. 5; such circuitry may be of any known type. Registers 7 and 8 are reset at the start and register 6 holds a mask code, e.g., 2222.

As soon as the search operation initiates (or eventually at the end of such search operation) the "I" coordinate of register 3, that is, one in this present example, is read into block 8I of register 8 via circuit 97. Said coordinate is held therein throughout the search operation.

Search procedure is described by referring to the twenty-four steps of FIG. 10. Line rank has been tabulated in the second column of chart 10, that is, 1 through 24.

*First step.*—Storage 5 is addressed via circuits 16, 17 and register 18 from register 7 holding at this time address 0000. Since no subscriber is connected to that half-way line, the corresponding block in storage 5 holds a mask code thus, storage 5 sends into register 6 mask information via register 19 and circuit 20. Then the compare circuits start operating. Since there is no subscriber address in register 6, comparison between "IJK" and "ijk" will yield "*I*"≠"*i*," "*J*"≠"*j*" and "*K*"≠"*k*". None of the gates 39, 44 and 50 are enabled and, therefore, neither are gates 83, 85 and 87. Register 8 remains locked on 0001. Since gate 122 does not detect address 1121, gate 129 will be enabled and circuit 14 sends a stepping pulse into register 7 whose contents become 0001.

*Second step.*—Storage addressing from register 7 causes address 1102 to be sent into register 6. The compare circuit yields "*I*"="*i*," "*J*"="*j*," "*A*"="*a*," "*B*"="*b*." Gates 44 and 73 are enabled and their corresponding output circuits 47 and 46 are excited. Gate 85 is enabled and circuit 90 causes a "one" addition into subregister 8B of register 8. The latter register now reads 0101. Since gate 122 has not detected address 1121, register 7 receives a stepping pulse and its contents becomes 0010.

*Third step.*—Address 0211 is read in register 6. The compare circuits of registers 3 and 6 yield nothing since "I" is different from "i." Therefore, none of the gates 83, 85 and 87 are enabled. Register 8's contents remain on 0101 and register 7 counts up; its contents read 0101.

*Fourth step.*—Register 6 holds a mask; none of the gates are enabled except for 129 which issues a stepping pulse to register 7. Register 8's contents stay locked on 0101 and register 7's contents become 0020.

*Fifth step.*—Address 0010 is written into register 6. The compare circuits from register 3 and 6 yield nothing. Register 8 stays on 0101 and register 7 moves up to 0021.

*Sixth step.*—Register 6 holds a mask, register 8 stays on 0101 and register 7 moves up to 0100.

*Seventh step.*—Register 6 holds a mask, register 8 stays on 0101 and register 7 moves up to 0101.

*Eighth step.*—Address 1110 is written into register 6. The compare circuits yield, "*I*"="*i*," "*J*"="*j*," "*K*"="*k*," "*A*"="*a*." Gate 87 becomes enabled and circuit 94 causes a one addition to block 8A of register 8 and a reset to zero of subregister 8B (8C was already reset). Register 8 moves up to 1001 and register 7 moves up to 0110.

*Ninth step.*—Address 0021 is written into register 6. The compare circuits yield nothing since "*I*"≠"*i*." Register 8 stays on 1001 and register 7 moves up to 0111.

*Tenth step.*—Address 1212 is read into register 6. The compare circuits yield "*I*"="*i*." Gate 39 is enabled but gate 83 is not since "*ABC*"≠"*abc*." Register 8 stays on 1001 and register 7 moves to 0120.

*Eleventh step.*—Address 0200 is read in register 6. The compare circuits yield nothing since "*I*"≠"*i*," register 8 stays on 1001 and register 7 moves to 0121.

*Twelfth step.*—Address 1020 is written into register 6. The compare circuits yield "*I*"="*i*" since "*ABC*"≠"*abc*," register 8 stays on 1001 and register 7 moves to 1000.

*Thirteenth step.*—Register 6 holds a mask. Register 8 stays on 1001 and register 7 moves to 1001.

*Fourteenth step.*—Address 1211 is read in register 6. The compare circuits indicate "*I*"="*i*," "*A*"="*a*," "*B*"="*b*" and "*C*"="*c*." Gate 83 is enabled and circuit 89 causes a one addition into subregister 8C. Register 8 moves to 1011 and register 7 moves to 1010.

*Fifteenth step.*—Register 6 holds a mask. Register 8 stays on 1011 and register 17 moves to 1011.

*Sixteenth step.*—Register 6 holds a mask. Register 8 stays on 1011 and register 7 moves to 1020.

*Seventeenth step.*—Address 0112 is written into register 6. The compare circuits yield nothing since "*I*"≠"*i*." Register 8 stays on 1011 and register 7 moves to 1021.

*Eighteenth step.*—Address 1100 is written into register 6. The compare circuits indicate "*I*"="*i*," "*J*"="*j*," "*A*"="*a*" and "*B*="*b*." Gate 85 is enabled and circuit 90 causes a one addition into block 8B of register 8, as well as, the reset to zero of subregister 8C. Register 8 then moves to 1101 and register 7 moves to 1100.

*Nineteenth step.*—Address 0002 is read into register 6. The compare circuits yield nothing since "*I*"≠"*i*." Register 8 stays on 1101 and register 7 moves to 1101.

*Twentieth step.*—Register 6 holds a mask. Register 8 stays on 1101 and register 7 moves to 1110.

*Twenty-first step.*—Address 0202 is read into register 6. The compare circuits yield nothing since "*I*"≠"*i*." Register 8 stays on 1101 and register 7 moves to 1111.

*Twenty-second step.*—Register 6 holds a mask. Register 8 stays on 1101 and register 7 moves to 1120.

*Twenty-third step.*—Register 6 holds a mask. Register 8 stays on 1101 and register 7 moves to 1121.

*Twenty-fourth step.*—Address 1011 is written into register 6. The compare circuits yield "*I*"="*i*" but since "*ABC*"≠"*abc*" register 8 stays on 1101. Gate 122 is enabled since address 1121 is present in register 7. The results are: (1) gate 129 is disabled and register 7 is kept from counting up, and (2) output circuit 23 from gate 133 is excited and issues a search end signal to device 4. At this point all existing paths have been examined and register 8 holds a halfway lead address, in this instant 1101, defining a free path between address 1101 and address 1112.

Device 4 then causes address 1101, held in register 8, to be addressed in storage 5 via circuits 21, 17 and register 18. Said device 4 causes address 1112 held in register 3 to be written into the storage block corresponding to address 1101 via circuit 22 and register 19.

Device 4 will also cause the path to be marked and established. The marking procedure will obviously depend on the particular design of the switching system and notably, of matrix switch nature (electronic or electromagnetic switches). However, owing to the law disclosed schematically on FIG. 3, it should be noted that the sole knowledge of both subscriber address "*ijkl*" and half-way lead address "*abci*" yields the coordinates of those switches to be closed in order to actually establish the path. By using the same reference as those of FIG. 2, said switches are:

$Q_{1a}$ for the first stage $ST_1$ that is $Q_{21}$ for the instant example $Q_{kb}$ for the second stage $ST_2$ that is $Q_{11}$ for the instant example $Q_{jc}$ for the third stage $ST_3$ that is $Q_{10}$ for the instant example.

Device 4 controls the setting back of registers 6, 7 and 8 as well as initiation of register 3 and thereby scanner 2 operation.

(2) Further successful path finding: Case when $a>A$

All initial conditions are considered identical to those of the previous case except that the above-mentioned chart will no longer contain the subscriber of address 1110 (row 8 from the chart in FIG. 10). FIG. 11 partially illustrates the corresponding chart for this example, rows prior to row 7 being identical to those of FIG. 10.

Up to the twelfth step and including the latter step, search operation is the same as in case 1. Upon the thirteenth step, gate 138 senses that the condition $a>A$ and circuit 23 delivers to device 4 an end of search signal. Said device 4 causes operations in progress to stop (notably the stepping of register 7). It also commands storage addressing in storage 5 of address 0101, the address held in register 8, for writing into that address subscriber address 1112, the address held in register 3. These two addresses define the new communication path to be established. As in the previous case, device 4 then orders both marking and actual establishment of said path as well as resetting of both register 3 and scanner 2.

*Unsuccessful attempt*: *Overflow.*—All initial conditions are taken as identical to those conditions of case 1 except that said existing path chart holds one more established communication path between subscriber address 1111 associated with half-way lead address 1101 (row 20 of chart). FIG. 12 partially discloses the corresponding chart, rows proceding row 17 being identical to those of FIG. 10.

Up to and including the nineteenth step everything goes on as in the first case above.

Upon the twentieth step, the compare circuits yield "*I*"="*i*," "*J*"="*j*," "*K*"="*k*" and "*A*"="*a*." Gate 87 is enabled and circuit 94 orders a one added into subregister 8A of register 8. 8A already holds a one and, since there cannot be a carry, circuits 115 and 116 (refer to FIG. 8) are excited, gate 117 is enabled and circuit 24 issues an overflow signal condition to device 4. The latter causes all operations in progress to stop (notably register 7 stepping), causes a busy signal to be sent to the 1112 subscriber line, and puts register 3 back into operation.

While the invention has been particularly shown and described with reference to a preferred embodiment thereof, it will be understood by those skilled in the art that various changes in form and details may be made therein without departing from the spirit and scope of the invention.

What is claimed is:

1. In a communication exchange having a plurality of input terminals and output terminals wherein said exchange is comprised of a plurality of switch means coupled via links means to form a switching network providing communication paths between said input and output terminals, apparatus for finding a free path for communication between a given input terminal and one of said output terminals comprising means providing information signals for each of said output terminals, each information signal identifying an input terminal, if any, from which there is a busy path for communication to the corresponding one of said output terminals, means providing a signal identifying a given input terminal, and means responsive to said information signals and said identified given input terminal signal for producing a signal identifying an output terminal to which a free path for communication is available from said given input terminal.

2. In a communication exchange having a plurality of input terminals and output terminals wherein said exchange is comprised of a plurality of switch means coupled via link means to form a switching network providing communication paths between said input and output terminals, apparatus for finding a free path for communication between a given input terminal and one of said output terminals comprising means providing a signal identifying a given input terminal, means responsive to said given input terminal signal for producing a signal in accordance with the identity of said given input terminal for identifying a potentially free output terminal, means providing information signals indicative of the state of said output terminals, and means for controlling said information signal providing means to provide said information signal corresponding to said identified output terminal thereby indicating whether said output terminal is free to be connected to a path for communication from said given input terminal.

3. Apparatus as claimed in claim 2 wherein each information signal identifies an input terminal if any from which there is a busy path for communication to the corresponding one of said output terminals.

4. Apparatus as claimed in claim 3 which includes means responsive to said given input terminal signal, said output terminal signal and said information signal indicating a busy path for communication to said identified output terminal for controlling said output terminal signal producing means to produce a signal identifying a predetermined other output terminal to which a potential free path for communication is available from said given input terminal.

5. Apparatus as claimed in claim 3 which includes means responsive to said given input terminal signal, said output terminal signal and said information signal indicating the absence of a busy path for communication to said identified output terminal for controlling said output terminal signal producing means to maintain said output terminal signal thereby indicating said identified output terminal is free to be connected to a path for communication from said given input terminal.

6. Apparatus as claimed in claim 5 wherein said first-mentioned controlling means is effective thereafter for controlling said information signal providing means to provide a series of said information signals corresponding to those output terminals which may have a link means in common with the link means of the potential free path for communication between said given input terminal and said identified output terminal, said second-mentioned controlling means including means responsive to said given input terminal signal, said output terminal signal and said series of said information signals for producing a signal indicating that the link means of the potential free path for communication is common with the link means of a busy path for communication, and means responsive to said common link signal for controlling said output terminal signal producing means to produce a signal identifying a predetermined other output terminal to which a potential free path for communication is available from said given input terminal.

7. Apparatus as claimed in claim 5 wherein said first-mentioned controlling means is effective thereafter for controlling said information signal providing means to provide a series of said information signals corresponding to those output terminals which may have a link means in common with the link means of the potential free path for communication between said given input terminal and said identified output terminal, said second-mentioned controlling means including means responsive to said given input terminal signal, said output terminal signal and said series of said information signals for producing a signal indicating that the link means of the potential free path for communication is not common with the link means of a busy path for communication, and means responsive to said non-common link signal for controlling said output terminal signal producing means to maintain said output terminal signal thereby identifying the output terminal to which a free path for communication is available from said given input terminal.

8. In a communication exchange having a plurality of input terminals and output terminals wherein said exchange is comprised of a plurality of switch means coupled via link means to form a switching network providing communication paths between said input and output terminals with each path being defined in terms of an input terminal address and an output terminal address, apparatus for finding a free path for communication between a given input terminal and one of said output terminals comprising storage means providing information signals for each of said output terminals, each information signal identifying an input terminal address, if any, from which there is a busy path for communication to the corresponding one of said output terminal addresses, means providing a signal identifying a given input terminal address, and means sequentially responsive to said information signals and said given input terminal address signal for determining if there is an output terminal address to which a free path for communication is available from said given input terminal address.

9. Apparatus as claimed in claim 8 including means responsive to said determining means for producing a signal identifying an output terminal address to which a free path for communication is available from said given input terminal address.

10. Apparatus as claimed in claim 8 including means responsive to said determining means for producing a signal indicating there is no available output terminal address to which a free path for communication is available from said given input terminal address.

11. In a communication exchange having a plurality of input terminals and output terminals wherein said exchange is comprised of a plurality of switch means coupled via link means to form a switching network providing communication paths between said input and output terminals with each path being defined in terms of an input terminal address and an output terminal address, apparatus for finding a free path for communication between a given input terminal and one of said output terminals comprising means providing a signal identifying a given input terminal address, register means responsive to said given input terminal address signal for producing a signal in accordance with the identity of said given input terminal address for identifying a potentially free output terminal address, storage means having a plurality of addressable storage locations corresponding to said plurality of output terminal addresses with each location address corresponding to an output terminal address and each location containing an information signal indicative of the state of said corresponding one of said output terminal addresses, and means providing a storage address signal for addressing said storage means to read out said information signal corresponding to said identified output terminal address thereby indicating whether said output terminal address is free to be connected to a path for communication from said given input terminal address.

12. Apparatus as claimed in claim 11 wherein each information signal identifies an input terminal address, if any, to which there is a busy path for communication from the corresponding one of said output terminal addresses.

13. Apparatus in accordance with claim 12 which includes logic means responsive to said given input terminal address signal, said output terminal address signal and said information signal indicating a busy path for communication to said identified output terminal address for modifying the setting of said register means to produce a signal corresponding to a predetermined other output terminal address to which a potential free path for communication is available from said given input terminal address.

14. Apparatus in accordance with claim 12 which includes logic means responsive to said given input terminal address signal, said output terminal address signal, and said information signal indicating the absence of a busy path for communication to said output terminal address for inhibiting modification of the setting of said register means whereby said output terminal address signal represents an output terminal address which is free to be connected to a path for communication from said given input terminal address.

15. Apparatus as claimed in claim 14 wherein said storage addressing means is effective thereafter for addressing said storage means to provide a series of said information signals corresponding to those output terminals which may have a link means in common with the link means of the potential free path for communication between said given input terminal and said identified output terminal, said logic means including means responsive to said given input terminal address signal, said output terminal address signal and said series of said information signals for producing a signal indicating that the link means of the potential free path for communication is not common with the link means of a busy path for communication, and means responsive to said non-common link signal for inhibiting modification of the setting of said register means whereby said output terminal address signal identifies the output terminal address to which a free path for communication is available from said given input terminal address.

16. Apparatus as claimed in claim 15 including means for storing said given input terminal address signal in said storage means at a location address corresponding from said output terminal address signal.

17. In a communication exchange having a plurality of input terminals and output terminals wherein said exchange is comprised of a plurality of switch means coupled via link means to form a switching network providing communication paths between said input and output terminals with each path being defined in terms of an input terminal address and an output terminal address, apparatus for finding a free path for communication between a given input terminal and one of said output terminals comprising means providing a signal identifiying a given input terminal address, register means responsive to said given input terminal address signal for producing a signal in accordance with the identity of said given input terminal address for identifying a potentially free output terminal address, storage means having a plurality of addressable storage locations corresponding to said plurality of output terminal addresses with each location address corresponding to an output terminal address and each location containing an information signal indicative of the state of said corresponding one of said output terminal addresses, means providing storage address signals for addressing said storage means to sequentially read out said information signals, logic means for comparing said information signals with said given input terminal address signal and for comparing said storage address signals with said output terminal address signal for producing a signal when one of said storage address signals corresponds to said output address signal and a corresponding information signal indicates an input terminal address from which there is a busy path for communication to said output terminal address, and means responsive to the signal produced by said logic means for modifying the setting of said register means to produce a signal corresponding to a predetermined other output terminal address to which a potential free path for communication is available from said given input terminal address.

18. In a communication exchange having a plurality of input terminals and output terminals wherein said exchange is comprised of a plurality of switch means coupled via link means to form a switching network providing communication paths between said input and output terminals with each path being defined in terms of an input terminal address and an output terminal address, apparatus for finding a free path for communication between a given input terminal and one of said output terminals comprising means providing a signal identifying a given input terminal address, register means responsive to said given input terminal address signal for producing a signal in accordance with the identity of said given input terminal address for identifying a potentially free output terminal address, storage means having a plurality of addressable storage locations corresponding to said plurality of output terminal addresses with each location address corresponding to an output terminal address and each location containing an information signal indicative of the state of said corresponding one of said output terminal addresses, means providing storage address signals for addressing said storage means to sequentially read out said information signals, logic means for comparing said information signals given input terminal address signal and for comparing said storage address signals with said output terminal address signal for producing a signal when one of said storage address signals corresponds to said output address signal and a corresponding information signal indicates the absence of an input terminal address from which there is a busy path for communication to said output terminal address, and means responsive to the signal produced by said logic means for inhibiting modification of the setting of said register means whereby said output terminal address signal represents an output terminal address which is free to be connected to a path for communication from said given input terminal address.

19. Apparatus as claimed in claim 18 wherein said logic means includes means effective thereafter comparing said information signals with said given input terminal address signal for those output terminal addresses which may have a link means in common with the link means of the potential free path for communicating between said given input terminal address and said free output terminal address and producing a signal indicating the link means of the potential free path for communication is common with the link means of a busy path for communication, and means responsive to said common link signal for modifying the setting of said register means to produce a signal corresponding to a predetermined other output terminal address to which a potential free path for communication is available from said given input terminal address.

20. Apparatus as claimed in claim 18 wherein said logic means includes means effective thereafter comparing said information signals with said given input terminal address signal for those output terminal addresses which may have a link means in common with the link means of the potential free path for communication between said given input terminal address and said free output terminal address and producing a signal indicating the link means of the potential free path for communication is not common with the link means of a busy path for communication, and means responsive to said non-common link signal for inibiting modification of the setting of said register means whereby said output terminal address signal represents the output terminal address to which a free path for communication is available from said given input terminal address.

21. Apparatus as claimed in claim 20 including means for storing said given input terminal address signal in said storage means at a location address corresponding to said output terminal address signal.

References Cited

UNITED STATES PATENTS

| | | |
|---|---|---|
| 3,223,785 | 12/1965 | Budlong et al. |
| 3,204,043 | 8/1965 | Arseneau et al. |
| 3,231,679 | 1/1966 | Lowry. |
| 3,324,249 | 6/1967 | Cotroneo et al. |
| 3,395,252 | 7/1968 | Taylor. |

WILLIAM C. COOPER, Primary Examiner